March 19, 1957 D. L. McKAY 2,786,058
PURIFICATION OF POLYMERIZABLE HETEROCYCLIC NITROGEN COMPOUNDS
Filed July 13, 1953
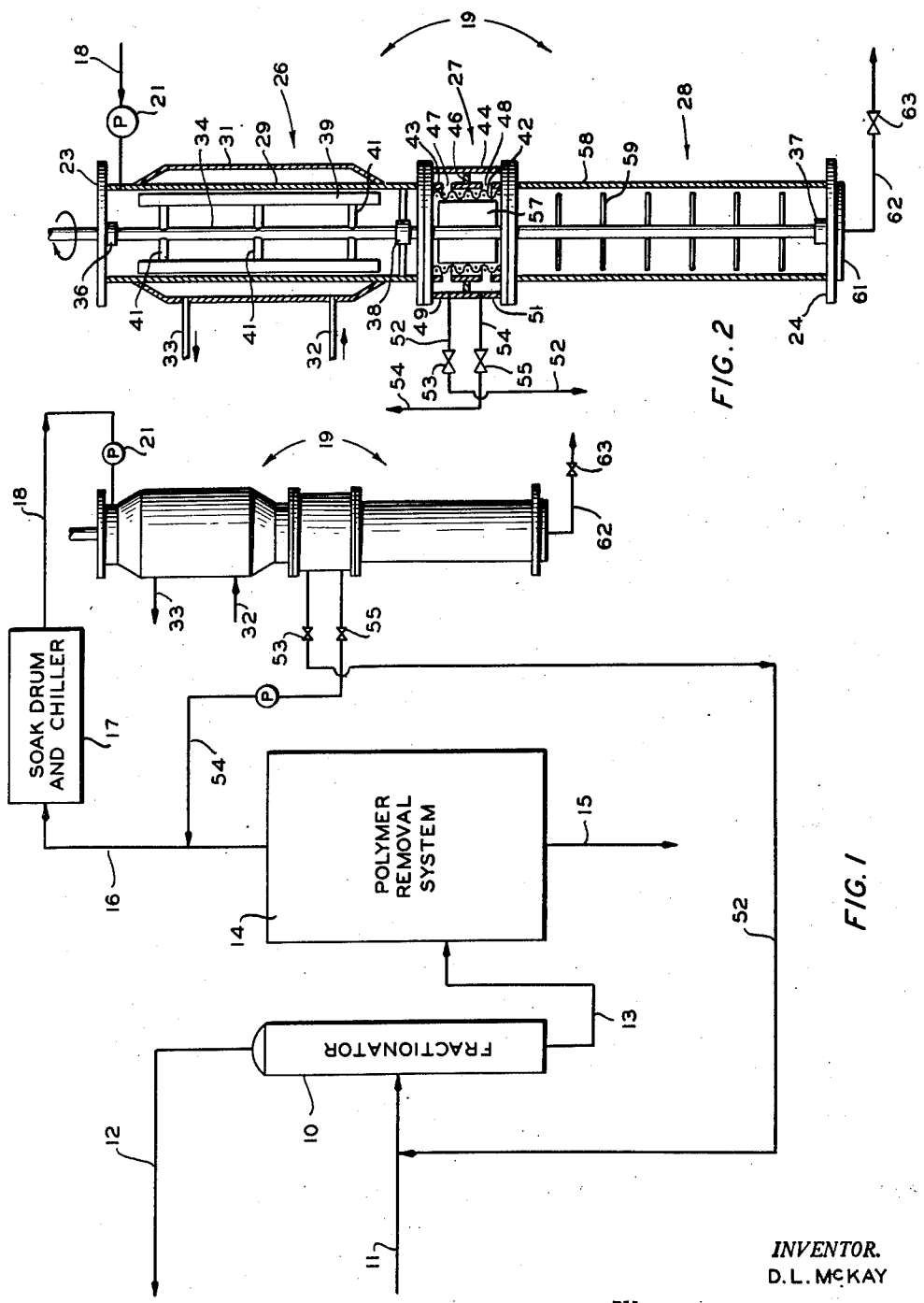
INVENTOR.
D. L. McKAY
BY Hudson and Young
ATTORNEYS

United States Patent Office 2,786,058
Patented Mar. 19, 1957

2,786,058

PURIFICATION OF POLYMERIZABLE HETERO-CYCLIC NITROGEN COMPOUNDS

Dwight L. McKay, Bartlesville, Okla., assignor to Phillips Petroleum Company, a corporation of Delaware Application July 13, 1953, Serial No. 367,424

12 Claims. (Cl. 260—290)

This invention relates to the separation and purification of heterocyclic nitrogen compound monomers. In one of its more specific aspects, it relates to the separation and purification of heterocyclic nitrogen compound monomers according to freezing points. In another of its more specific aspects, it relates to a process for the separation and purification of polymerizable heterocyclic nitrogen compounds wherein any polymers present are removed prior to separation and purification of the desired product. In another of its more specific aspects, it relates to the separation and purification by fractional crystallization of 2-methyl-5-vinylpyridine (MVP) from a mixture of the same with 5-ethyl-2-methylpyridine (MEP).

When preparing heterocyclic nitrogen compound monomers, the monomers are usually recovered in admixture with the starting material which necessitates some method of separation and purification in order to obtain the desired product. For example, in the preparation of vinylpyridines by passing the corresponding ethylpyridines over an active high temperature dehydrogenation catalyst at temperatures between 450° C. and 800° C., a mixture is obtained which contains vinylpyridine, ethylpyridine and impurities in small amounts. Various methods for the separation of vinylpyridine from ethylpyridine appear in the literature, but such methods in general fail to produce a final product of the high purity required for commercial use. For instance, in the case of 2-methyl-5-vinylpyridine (MVP), a purification of 95 percent MVP or better is necessary in order to obtain a marketable product. By utilizing the separation and purification process of this invention, it is possible to obtain heterocyclic nitrogen compounds which meet the high standards of purity required of monomers.

The following objects will be attained by the various aspects of the invention.

It is an object of the present invention to provide a process for the separation and purification of heterocyclic nitrogen compound monomers.

Another object is to provide a fractional crystallization process for the separation and purification of heterocyclic nitrogen compounds, which have a tendency to polymerize, wherein polymer removal is effected prior to the separation and purification of the final product.

Still another object is to provide a process for the separation and purification of polymerizable heterocyclic nitrogen compounds wherein a high purity product is obtained.

A further object is to provide a fractional crystallization process for the separation and purification of 2-methyl-5-vinylpyridine from a mixture of the same with 5-ethyl-2-methylpyridine.

Still other objects and advantages will be apparent to those skilled in the art from the following description and disclosure.

In accordance with one application of the present invention wherein 2-methyl-5-vinylpyridine (MVP) is prepared from 5-ethyl-2-methylpyridine (MEP) by dehydrogenation, a mixture containing approximately 30 to 35 percent of MVP, a major proportion of MEP, small amounts of picolines, and unidentified polymerization initiating materials is fractionated under reduced pressures in order to concentrate the MVP. While it is preferred that the ratio of MVP to MEP in the MVP concentrate be at least 60 percent, it is to be understood that a concentrate in which the ratio of MVP to MEP is in excess of the MVP–MEP eutectic ratio can be utilized. The polymers contained in the MVP concentrate are thereafter removed by flashing the MVP from the polymers at extremely reduced pressures, or the removal can be effected by the addition of pentane or lighter hydrocarbons so as to cause a phase separation of the polymers. The MVP concentrate is then passed into a soaking drum where the temperature of the concentrate is lowered to about that at which crystals of MVP are formed. Thereafter the MVP concentrate is introduced into an elongated column and passed through a cooling zone disposed in the upper portion of the column where it is cooled to a temperature such as to form a slurry of MVP crystals and mother liquor. The crystals are then separated from the mother liquor and thereafter passed into an elongated purification zone so as to form a uniform contiguous mass of crystals therein. The mass of crystals is moved through the purification zone in the downstream end of which with respect to crystal movement a melting zone is maintained at a temperature at least as high as the melting point of the crystals. When the crystals enter the melting zone, they are melted and a portion of the resultant melt is withdrawn as high purity MVP. The remainder of the melt is displaced countercurrently to the movement of crystals and in intimate contact therewith so as to remove therefrom the occluded impurities.

While the application of the invention as discussed above, and as will be illustrated hereinafter, is specific to the separation and purification of 2-methyl-5-vinylpyridine, it is not intended to so limit the invention. It is to be understood that the invention is applicable to other alkene, alkadiene, and alkyne heterocyclic nitrogen compounds such as vinylpyridine, alkyl and alkenyl substituted vinylpyridines, where the substituted radical contains 1 to 4 carbon atoms, vinyl quinoline, alkyl and alkenyl substituted vinyl quinolines where the substituted radical contains 1 to 4 carbon atoms, and the like, and like alkene, alkadiene, and alkyne substituted pyridines, quinolines, isoquinolines, piperidines, pyrroles, pyrrolidines and pyrrolidones.

Furthermore, it is not intended to limit the process of the present invention to the separation and purification of polymerizable heterocyclic nitrogen compounds from mixtures of polymerizable and non-polymerizable heterocyclic nitrogen compounds in which the polymerizable material is the higher boiling component and the non-polymerizable material is the lower boiling component. Accordingly, it is within the scope of the invention to separate mixtures in which the polymerizable material is the lower boiling component and the non-polymerizable material is the higher boiling component. When effecting the separation of the polymerizable material from such a mixture, the polymerizable material as the lower boiling component is taken overhead from the fractionator and recovered as the product. A concentrate in which the higher boiling component or non-polymerizable material is present in excess of the eutectic ratio of the higher boiling component to the lower boiling component is thereafter passed to a fractional crystallization apparatus from which high purity non-polymerizable material is recovered. The non-polymerizable material is then passed to the dehydrogenation zone for further treatment.

For a more complete understanding of the invention, reference may be had to the drawing, in which:

Figure 1 illustrates diagrammatically an arrangement of apparatus suitable for practicing the present invention; and Figure 2 is a diagrammatic elevational view of a fractional crystallization apparatus suitable for use in the practice of the present invention.

Referring to the drawing and in particular to Figure 1, a mixture, for example, containing about 30 to 35 percent MVP and about 65 to 70 percent MEP is passed from a dehydrogenation unit and introduced into fractionator 10 through line 11 where the mixture is fractionated under reduced pressures in order to concentrate the MVP. Although the fractionator is operated under reduced pressures in order to inhibit polymerization, some polymers are formed therein which must be removed as will be explained hereinafter. It is also within the contemplation of the present invention to add to the fractionator an inhibitor, such as sulfur, ditertiary butyl catechol, or ditertiary butyl polysulphide in order to inhibit to a certain extent the polymer formation therein. An essentially pure stream of MEP, taken overhead through line 12 from fractionator 10, is recycled to the dehydrogenation unit. A bottoms product containing approximately 80 to 90 percent MVP, 8 to 18 percent MEP, and 2 to 4 percent polymer is withdrawn from fractionator 10 through line 13 and thereafter introduced into polymer removal system 14. The polymer can be removed from the MVP by flashing the MVP concentrate from the polymer by flash distillation, or the removal can be effected by the addition of low-boiling hydrocarbons so as to cause a phase separation of the polymer. In this latter method of polymer removal, a low boiling hydrocarbon is added to the MVP concentrate in an amount in excess of one-tenth of the volume of the concentrate, thereby causing the polymeric material present to precipitate and coagulate out of the concentrate. Thereafter, the concentrate is recovered from the low boiling hydrocarbons by stripping the hydrocarbons from the concentrate at reduced pressures. In this method, it is preferred to utilize a hydrocarbon of 3 to 6 carbon atoms selected from a group consisting of normal paraffins, isoparaffins, cyclic paraffins and alkyl substituted paraffins. For a more complete description of the polymer removal method by the addition of low boiling hydrocarbons, reference may be made to the copending U. S. application, Serial No. 363,248, filed June 22, 1953, of D. M. Haskell and D. L. McKay. The polymer is removed through line 15 while the polymer-free MVP concentrate is withdrawn from the polymer removal system through line 16 and introduced into a combination soak drum and chiller 17 wherein the temperature of the concentrate is lowered to about that at which crystals of MVP are formed. It is also within the contemplation of the invention to cool the MVP concentrate to a temperature at which crystals of MVP are actually formed in which case the scraped chiller can be omitted from the fractional crystallization apparatus to be described hereinafter.

The cooled MVP concentrate is removed from the combination soak drum and chiller 17 through line 18 and is introduced into the upper portion of fractional crystallization apparatus 19 under hydraulic pressure developed by positive displacement pump 21.

A better understanding of a fractional crystallization apparatus suitable for use in the process of this invention and its manner of operation can be obtained by referring to Figure 2. An upright elongated column 19 is provided with upper and lower closure members 23 and 24, respectively, and is divided into three principal sections, namely, a scraped surface chiller 26, a filter section 27, and a crystal purification column 28. Scraped surface chiller 26 comprises a tubular member 29 surrounded by an annular jacket 31 which is provided with refrigerant inlet line 32 and refrigerant outlet line 33, by means of which refrigerant is introduced into and withdrawn from the annular space between tubular member 29 and jacket 31. A vertical shaft 34 is centrally disposed within column 22 and is supported by means of upper and lower bearing 36 and 37, respectively, and intermediate bearing 38. A plurality of blades 39, attached to vertical shaft 34 by a series of cross members 41, are positioned in close proximity to the walls of tubular member 29 and extend longitudinally throughout the length of that member.

Filter section 27, disposed immediately below scraped surface chiller 26 and connected thereto, comprises a filter screen 42, substantially cylindrical in shape, positioned within tube 43, which in turn is surrounded by jacket 44. The annular section between tube 43 and jacket 44 is divided into an upper and a lower part by ring member 46. Tube 43 is perforated as by an upper row of holes 47 and a lower row of holes 48, the holes being spaced around the circumference of the tube near its bottom and top. By this arrangement of elements as described, filter section 27 is in effect divided into upper and lower filters 49 and 51, respectively. Line 52, containing valve 53, provides means for withdrawing mother liquor from upper filter 49 while line 54, containing valve 55, connects with lower filter 51 for withdrawal of the reflux stream. A plurality of scraper blades 57 are attached to shaft 34 in close proximity to filter screen 42 and provide means for preventing the clogging of the filter with crystals.

Crystal purification column 28 is connected to filter section 27 and comprises vertical pipe 58 closed at its lower end by closure member 24. A plurality of radial rods 59 are attached to that portion of shaft 34 disposed within column 28. A heat exchange means is provided at the lower end of column 28 in order to maintain a relatively high temperature at that end. As illustrated, the heat exchange means is an electrical heater 61 positioned next to closure member 24, but other means may be employed, for example, a coil through which a heat transfer medium is circulated can be disposed within column 28 at its lower end. Outlet line 62, containing valve 63, is connected to the lower end of column 28 and provides means for withdrawing a controlled amount of high purity MVP from the column.

Shaft 34 extends through upper closure member 23 and is operatively connected to a motor, not shown. The rotation of shaft 34 rotates scraper blades 39, scraper blades 57, and stirrer rods 59 within scraped surface chiller 26, filter section 27, and crystal purification column 28, respectively.

In the operation of the fractional crystallization apparatus, referring to both Figures 1 and 2, the MVP concentrate is introduced through line 18 into scraped surface chiller 26 under hydraulic pressure developed by pump 21. Refrigerant is passed into the annular space between tubular member 29 and annular jacket 31 through line 32 and withdrawn therefrom through line 33 at a rate sufficient to maintain scraped surface chiller 26 at a temperature low enough to crystallize the MVP. The MVP concentrate fills the entire length of elongated column 19, and a superatmospheric pressure is maintained at the top of chiller 26 through the operation of pump 21. Because of the low chiller temperature, crystals of MVP are frozen out, thus forming a slurry of crystals and mother liquor. Shaft 34 is being slowly rotated, thus causing scraper blades 39 to remove any crystals forming on the walls of tubular member 29.

As previously stated, it is within the contemplation of this invention to cool the MVP concentrate within soak drum and chiller 17 to a sufficiently low temperature to form crystals therein. When operating in this manner, a slurry of crystals and mother liquor is passed into chiller 26 through line 18, and a final cooling operation wherein additional crystals are formed takes place within chiller 26. Alternatively, chiller 26 can be omitted from the column and the slurry introduced directly into the filter section.

The slurry of mother liquor and crystals flows downwardly through chiller 26 and enters filter section 27 where the crystals are separated from the mother liquor by removal of the liquid through upper filter 49 and line 52 connected thereto. The mother liquor withdrawn from upper filter 49 through line 52 is thereafter recycled to line 11 for introduction into fractionator 10. Filter scraper blades 57 slowly rotate with shaft 34, thus preventing crystals from plugging filter screen 42 and ensuring free passage of liquid therethrough. The crystals containing occluded impurities then enter crystal purification column 28 displacing the liquid therein and forming a uniform contiguous mass of crystals. Stirrer rods 59 slowly rotate with shaft 34, continuously stirring the crystals so as to maintain a uniform mass and prevent channeling of the displaced liquid therethrough. By means of heater 61, the lower end of crystal purification column 28 is maintained at a temperature at least as high as the melting point of the crystals. The mass of crystals is moved downwardly through column 28 towards the high temperature end by the combination of the force of gravity and the hydraulic force exerted by the MVP concentrate entering the top of column 19. On reaching the high temperature end of column 28, the crystals are melted and a portion of the resulting melt is withdrawn through line 62 as high purity liquid MVP while the remainder of the liquid is displaced upwardly as a reflux stream through the downwardly moving mass of crystals and in intimate contact therewith. By continuously stirring the mass of crystals, channeling of the reflux stream in its passage through the crystals is prevented. The reflux stream is removed from column 19 through lower filter 51 by means of line 54 and is recycled to line 16 for introduction into soak drum and chiller 17. Alternatively, the reflux stream can be recycled to line 18 for introduction directly into scraped surface chiller 26.

The reflux stream passes countercurrently to the downward movement of the crystals through the combined effect of withdrawing only a portion of the melt from crystal purification column 28 and the liquid displacing action of the uniform contiguous mass of crystals moving downwardly as a result of the force of gravity and the hydraulic force exerted by the MVP concentrate introduced into column 19. The high purity of product obtainable is due primarily to the washing action of the reflux stream passing upwardly through the column in intimate contact with the crystals. By continuously stirring the crystals, the maintenance of a uniform mass of crystals is assured, and channeling of the reflux stream is prevented. Thus, the washing action of the reflux stream is more effective in removing occluded impurities from the crystals. Other systems which utilize a displaced reflux stream and thereby obtain a high purity product are disclosed by P. M. Arnold in U. S. Patent No. 2,540,977, by J. Schmidt in U. S. Patent No. 2,617,274, and by me in my copending U. S. application, Serial No. 375,850, filed August 24, 1953.

The following illustrative example, which is not intended to be limitative of the invention, will provide a more comprehensive understanding of the invention.

For this example, a fractional crystallization apparatus comprising a 4 inch diameter, 4 foot long scraped surface chiller; a 4 inch diameter, 6 inch long filter section; and an 18 inch long, 4 inch diameter purification column was utilized. An MVP–MEP mixture was pumped into the top of the chiller, and the crystals and mother liquor flowed concurrently through the chiller into the filter section where the mother liquor was withdrawn. The filter screen positioned in the filter section was continuously scraped to prevent clogging of the screen. The MVP crystals moved downwardly through the purification column as a uniform contiguous mass countercurrent to a reflux stream flowing up the column from the melting zone. The crystal mass in the purification column was continuously stirred so as to maintain the mass uniform and to prevent channeling of the reflux stream. A summary of the operating conditions and the experimental results is presented in the following table.

| Temp., °F. | | | Rates, Gal./Hr. | | | | Composition, Wt. Percent MVP | | | | High Melting Product Yield, Volume Percent |
|---|---|---|---|---|---|---|---|---|---|---|---|
| Propane | | MVP-MEP | | | | | | | | | |
| Chiller Inlet | Chiller Outlet | Feed | Feed | Low Melting Product | Reflux | High Melting Product | Feed | Low Melting Product | Reflux | High Melting Product | |
| −34 | −14.5 | 72 | 5.85 | 5.08 | 0.26 | 0.52 | 76.2 | 75 | 80.8 | 97.5 | 8.8 |
| −29 | −16 | 65 | 3.8 | 2.54 | 0.25 | 0.01 | 76.5 | 70 | 80 | 95 | 26.6 |
| −32 | −17 | 76 | 3.8 | 2.1 | 1.2 | 0.5 | 75.1 | 72.8 | 75.1 | 95 | 13.1 |

By carrying out the separation and purification of MVP in accordance with the process of this invention, it is possible to obtain a high purity product which meets the commercial standards of purity. It is to be understood that it is not intended to limit this inventoin to the separation and purification of 2-methyl-5-vinylpyridine, but rather the invention is applicable to the separation and purification of polymerizable heterocyclic nitrogen compounds as discussed previously in the specification. Furthermore, although a specific fractional crystallization apparatus has been described for use in the practice of the process of the present invention, it is not intended to so limit the invention to this particular apparatus. Accordingly, it is within the contemplation of the invention to utilize other types of fractional crystallization apparatus, as for example, those disclosed in U. S. Patents Nos. 2,540,977 and 2,617,274, previously referred to.

As will be evident to those skilled in the art, various modifications of this invention can be made or followed in the light of the foregoing disclosure and discussion without departing from the spirit or scope of the invention.

I claim:

1. In a process for the recovery of a polymerizable heterocyclic-nitrogen compound from a mixture of organic compounds and polymeric material in which the mixture is cooled to a temperature such as to form a slurry of crystals of the polymerizable heterocyclic-nitrogen compound and mother liquor and crystals are separated from the mother liquor as product, the improvement which comprises recycling mother liquor free of crystals to said mixture of organic compounds and removing from said mixture and mother liquor substantially all of the polymeric material contained therein prior to the cooling step.

2. The process of claim 1 in which removal of polymeric material from the mixture is effected by distillation whereby the polymeric material is concentrated in the distillation bottoms.

3. In a process for the separation and purification of polymerizable heterocyclic-nitrogen compounds in which a mixture of organic compounds comprising at least one polymerizable and at least one non-polymerizable heterocyclic-nitrogen compound and polymeric material is cooled to a temperature such as to form a slurry of crystals of the polymerizable heterocyclic-nitrogen compound and mother liquor and crystals are separated from the mother liquor as product, the improvement which comprises recycling mother liquor free of crystals to said mixture of organic compounds and removing from said mixture and mother liquor substantially all of the polymeric material contained therein prior to the cooling step.

4. The process of claim 3 in which removal of polymeric material from the mixture is effected by distillation, whereby the polymeric material is concentrated in the distillation bottoms.

5. The process of claim 3 wherein the non-polymerizable material is 5-ethyl,2-methyl pyridine and the polymerizable material is 2-methyl,5-vinyl pyridine.

6. In a process for the separation and purification of 2-methyl,5-vinyl pyridine in which a mixture of organic compounds comprising 2-methyl,5-vinyl pyridine (MVP) and 5-ethyl,2-methyl pyridine (MEP) containing polymeric material is cooled to a temperature such as to form a slurry of crystals of MVP and mother liquor, crystals are separated from the mother liquor, melted, a portion of the resulting melt is passed through the unmelted crystals and the remainder of the melt is recovered as product, the improvement which comprises recycling mother liquor free of crystals to the mixture of organic compounds and removing polymeric material from the mixture and mother liquor prior to the cooling step in a distillation zone, the polymeric material being concentrated in the distillation bottoms.

7. In a process for the separation and purification of polymerizable heterocyclic nitrogen compound in which a mixture of organic compounds comprising polymerizable and non-polymerizable heterocyclic nitrogen material and polymeric material is prefractionated so as to concentrate the polymerizable heterocyclic-nitrogen material, the mixture is cooled to a temperature such as to form a slurry of crystals of the polymerizable heterocyclic nitrogen material and mother liquor, crystals are separated from the mother liquor, melted, a portion of the resulting melt is passed through the unmelted crystals and the remainder of the melt is recovered as product, the improvement which comprises recycling mother liquor free of crystals to the mixture of organic compounds before prefractionation and removing from the mixture and mother liquor substantially all of the polymeric material contained therein prior to the cooling step.

8. In a process for the separation and purification of a polymerizable heterocyclic-nitrogen compound in which a mixture of organic compounds containing a polymerizable heterocyclic-nitrogen compound, a non-polymerizable heterocyclic nitrogen compound and polymeric material is prefractionated so as to produce a concentrate in which the polymerizable material is present in excess of eutectic ratio of the polymerizable material to the non-polymerizable material, the mixture is cooled to a temperature such as to form a slurry of crystals of the polymerizable heterocyclic-nitrogen material, crystals are separated from the mother liquor, melted, a portion of the resulting melt is passed through the unmelted crystals and the remainder of the melt is recovered as product, the improvement which comprises recycling mother liquor free of crystals to the mixture of organic compounds before prefractionation and removing from the mixture and mother liquor substantially all of the polymeric material contained therein prior to the cooling step.

9. The process of claim 7 in which the polymerizable heterocyclic-nitrogen compound is selected from the group consisting of 2-methyl 5-vinyl pyridine, vinyl pyridines, alkyl and alkenyl substituted vinyl pyridines where the substituted radical contains 1 to 4 carbon atoms, vinyl quinolines and alkyl and alkenyl substituted vinyl quinolines wherein the substituted radical contains 1 to 4 carbon atoms.

10. The process of claim 7 in which the non-polymerizable material is 5-ethyl 2-methyl pyridine and the polymerizable material is 2-methyl 5-vniyl pyridine.

11. In a process for the recovery of a polymerizable heterocyclic nitrogen compound from a feed material containing a mixture of organic compounds and a polymeric material in which the mixture is cooled to a temperature such as to form a slurry of crystals of the polymerizable heterocyclic nitrogen compound and mother liquor and crystals are separated from the mother liquor as product, the improvement which comprises recycling as additional feed material, mother liquor free of crystals and treating feed material to remove substantially all of the polymeric material contained therein prior to the cooling step.

12. The process of claim 11 in which removal of polymeric material from feed material is effected by distillation whereby the polymeric material is concentrated in the distillation bottoms.

References Cited in the file of this patent
UNITED STATES PATENTS

| | | |
|---|---|---|
| 1,991,843 | Campbell | Feb. 19, 1935 |
| 1,991,844 | Campbell | Feb. 19, 1935 |
| 2,383,174 | Weir | Aug. 21, 1945 |
| 2,402,158 | Glowacki | June 18, 1946 |
| 2,413,674 | Weir | Dec. 31, 1946 |
| 2,603,667 | Pankratz et al. | July 15, 1952 |
| 2,611,769 | Hays | Sept. 23, 1952 |
| 2,659,761 | Frevel et al. | Nov. 17, 1953 |
| 2,679,539 | McKay | May 25, 1954 |
| 2,683,178 | Findlay | July 6, 1954 |